United States Patent [19]

Ward

[11] Patent Number: 5,166,925
[45] Date of Patent: Nov. 24, 1992

[54] T CARRIER NETWORK TEST APPARATUS AND METHOD

[76] Inventor: Marvin W. Ward, 6602 Ashmere, Centreville, Va. 22020

[21] Appl. No.: 591,636

[22] Filed: Oct. 2, 1990

[51] Int. Cl.[5] .......................... H04J 3/14; H04M 3/24
[52] U.S. Cl. ........................................ 370/55; 370/13; 371/20.6; 379/27
[58] Field of Search ................. 370/13, 15, 17, 55, 370/58.1, 110.1; 371/20.5, 20.6, 20.1; 379/15, 27, 29

[56] References Cited

U.S. PATENT DOCUMENTS 4,641,299 2/1987 Kemper et al. ...................... 370/13
4,996,695 2/1991 Dack et al. ........................... 370/13

Primary Examiner—Douglas W. Olms
Assistant Examiner—Min Jung
Attorney, Agent, or Firm—Lowe, Price, LeBlanc & Becker

[57] ABSTRACT

A customer service unit (CSU) with adjunct equipment is connected to the end of a T Carrier link at the trunk side of a CPE switch such as a PBX and includes one or more connections around the CPE switch to the line or station side. The adjunct includes a facility for dropping and inserting a selected T Carrier link connected to the CPE switch and to route the insert via one of the connections around the CPE switch to the line side thereof. The adjunct is controlled by a remote terminal which may be disposed at a primary switch to which the CPE switch is connected by a T Carrier trunk which includes the T Carrier links. The combination is arranged to permit the establishment of a loop circuit from one port of a MAP position at the primary switch through a preselected T Carrier link into the trunk side of the CPE switch and thence through the circuit around the switch to the adjunct and insert back to the primary switch and the second MAP port thereof. The arrangement permits testing both from the MAP position and from the insert position.

16 Claims, 4 Drawing Sheets

T CARRIER NETWORK TEST APPARATUS AND METHOD

TECHNICAL FIELD

The present invention relates generally to testing of data and voice circuits to a remotely located switch, PBX and other terminating equipment in digital based telecommunications systems.

BACKGROUND ART

Telecommunications circuits conventionally span long distances and involve multiple terminal and facility owners in order to complete a circuit from one point to another along a T Carrier transmission facility. The communications link includes a multiplicity of interconnected terminal and multiplex devices forming a system network. The transmission links which form the network in turn handle large numbers of DSO signals. The circuits are interacted and switched from one network to another through sophisticated switching devices. During the process the DSO signals pass through numerous types of equipment and transmission links such as copper cable, terrestrial microwave radio, satellites, fiber optics facilities and equipment to transfer data and voice from one site to another.

Various types of transmission protocols, called interfaces, have become standardized. Typical standards depend upon the type of signal and the transmission bit rate and T Carrier transmissions are transmitted via such methods through such standard interfaces. The data may comprise voice signals, data signals, data protocols, timing signals and dial telephone switching signaling protocols for completing a telephone call from one point to another.

The operation of these networks and equipment requires troubleshooting and this entails monitoring the signals delivered to the end user. Typically a bit error rate test set (BERT) is used to monitor the T Carrier facility signal quality and analog test equipment and signaling test equipment is used to monitor the voice and dialing quality. A lower rate BERT is used to test low bit rare data signals operating at bit speeds of 2.4 to 64 Kbs.

Typically a technician must travel to the site and use several pieces of test equipment to troubleshoot one circuit. For example, if a dialing problem or a no ring problem were to be reported by a CPE end user of a long haul circuit, the long haul carrier would have to dispatch a technician to the site with sufficient test equipment of an appropriate type. The technician would disconnect the subscriber from the line side of the remote PBX or switch, connect the test equipment to the line, and dial the circuit. This would require a second technician at the local switch MAP position to test the dialing protocols and to verify the problem if the problem is not at the remote PBX site.

CPE users are understandably dissatisfied with poor service and the problem of having multiple entities or companies involved in a simple communication circuit magnifies the problem. Acceptable preventive maintenance is difficult because the scheduling may require removing the circuit from service for testing. When the circuits are in use the customer does not desire maintenance interruptions.

The necessity of having portable test equipment brought on site requires valuable time and the needed type of equipment may not be available. Attempts at testing problems using remote control diagnostic measuring equipment have proven expensive to the extent that many remote small facilities cannot justify the expense of installing remote test equipment. Some facilities and networks have installed relatively costly equipment at larger sites while leaving smaller sites without the automated equipment necessary to perform tests and maintenance. This has created a problem for even the larger carriers and local companies desiring to provide the same level of service at every level of the network. The problem continues to exist and many smaller sites and networks suffer in circuit quality, dependability and circuit availability. Frequently there is considerable time required to react to problems once detected due to the great distances which must be spanned by the available equipment.

DISCLOSURE OF THE INVENTION

It is an object of the present invention to provide a new and improved system for testing remotely located telecommunications equipment such as switches, PBXs, and local networking terminal lines without the need for costly test equipment on site.

It is another object of the invention to provide a new and improved method of testing communication terminals and networks without interrupting large numbers of the involved circuits by opening a single circuit on a facility which includes large numbers of DSO circuits.

it is another object of the invention to provide a new and improved method of testing interfaces and equipment without the need to travel long distances and transport a multiplicity of costly test equipment.

It is another object of the invention to provide a means of preventive maintenance which may be performed at the local switch location by a single technician testing comprehensively through the remote terminal equipment and facilities.

The test method according to the invention includes providing a unique module which includes a Customer Service Unit (CSU) with additional equipment and features connected to the end of a T-carrier link at the end user premise before the T-carrier signal passes into the trunk side of the CPE switch, PBX or the like. The new module includes the necessary elements to permit communication between the module and a distant control terminal. The module is arranged to react to commands from the remote control terminal to drop and insert a T-Carrier link and to route the insert to any of multiple types of circuit interfaces which are hard wired to the CPE switch, PBX or the like. Such interfaces may provide interconnects to other equipment such as 2/wire and 4/wire ground or loop start lines of a PBX or switch. Another interface is an ISDN channel voice, data and signaling interface to provide the dialing and signaling protocols required to interface and communicate with ISDN circuits used at PBX switch and terminal sites.

It is accordingly an object of the invention to provide in a communications network having primary and subsidiary switches connected by a T Carrier trunk including multiple T Carrier links, a Remote Access Check (REACH) device associated with one of the T Carrier links at the subsidiary switch, and a control terminal connected to the REACH device by a control link wherein the REACH device is connected to the line side of the subsidiary switch means in the manner of a station thereto, and the REACH device includes a drop and insert capability for dropping and inserting one or more channels of the T Carrier link with which it is associated whereby a loop circuit may be established from one port of a maintenance access port (MAP) of the primary switch to the trunk side of the subsidiary switch and through the subsidiary switch to the line side thereof and back to the other port of the MAP.

It is still another object of the invention to provide a method of operating a communications network having a primary switch spaced from and connected to a subsidiary switch through a T Carrier trunk which includes multiple T Carrier links wherein the subsidiary switch has multiple stations connected at the line side, comprising the steps of dropping and inserting a channel of a first T Carrier link at the trunk side of the subsidiary switch, establishing communication from the line side of the subsidiary switch around that switch to the primary switch end of the inserted channel, and accessing a preselected second T Carrier link remote from the subsidiary switch and establishing a connection through the accessed second T Carrier link through the subsidiary switch to the line side thereof and the circuit extending around the subsidiary switch to the insert and first T Carrier link to establish a loop circuit having ends which are remote from the subsidiary switch.

These and further objects and advantages of the invention will become more apparent on reference to the following specification, claims and drawings.

BEST MODE FOR CARRYING OUT THE INVENTION

Figure 1:
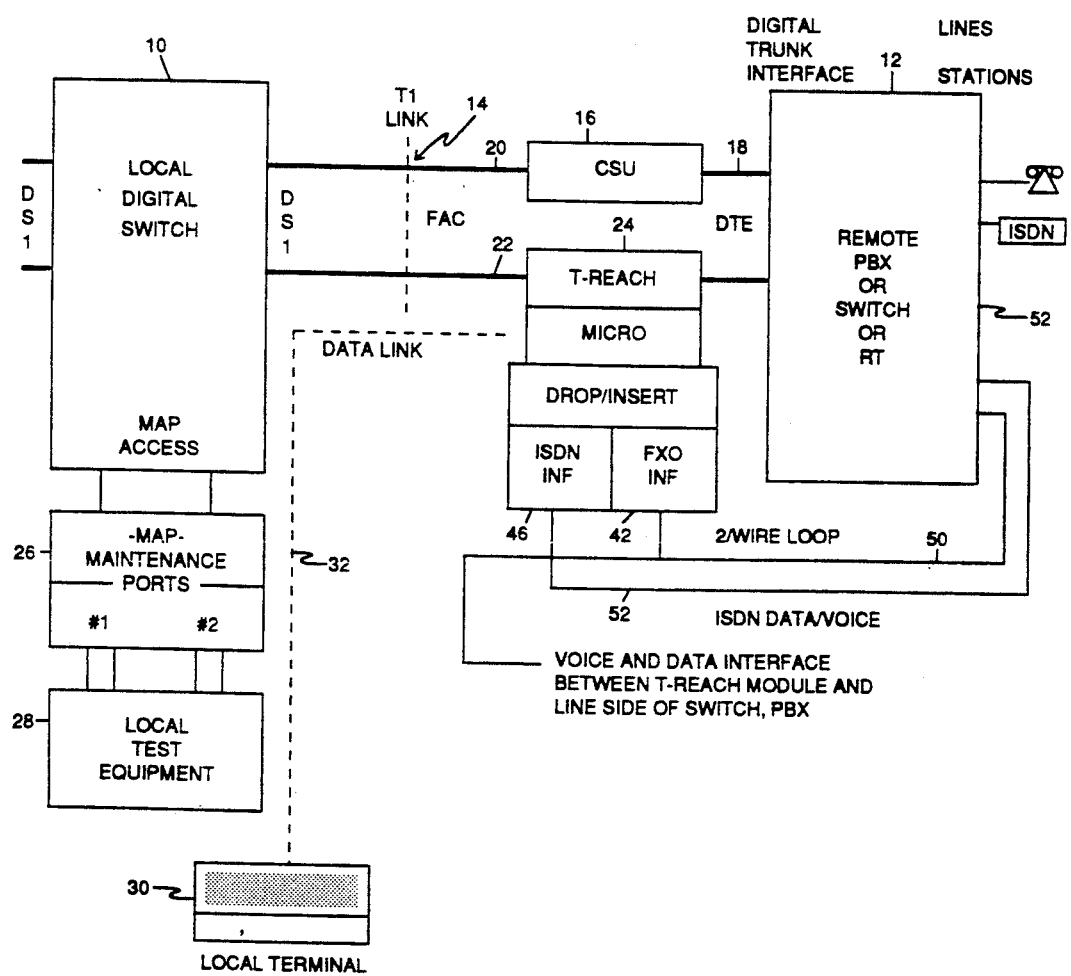
FIG. 1 is a diagrammatic illustration of a system constructed according to one embodiment of the invention.

Referring to FIG. 1 there is seen a local central office digital switch 10 connected to remote customer premise equipment (CPE) such as a Northern Telecom VMS100 or AT&T Dimension PBX or switch 12. The signals between the switch 10 and PBX 12 are carried by DSl signals on a Tl link indicated generally at 14. The Tl link may be of any type and may include a long haul carrier such as AT&T, MCI, Sprint or the like. A conventional customer service unit (CSU) 16 such as a Larus, Verilink or Kentrox is connected in the first or upper Tl facility or link between line 18 on the trunk or Data Terminal Equipment (DTE) side and line 20 on the facility side line 20. As is known the standard Tl link used in the United States carries 24 DSO circuits. The lowermost Tl facility or link 22 is connected through the module 24 to the remote PBX. The new module 24 is herein referred to as a T-Remote Equipment Analysis Check or T-REACH module. The CSU and/or T-REACH module may be owned by the end user who owns the switch or PBX or may be owned by the telephone company. If the CSU/T-REACH are owned by the end user or customer the demarcation line is at the facility side of the CSU/T-REACH. If the CSU/T-REACH are owned by the telephone company the demarcation line is at the DTE side of the CSU/T-REACH.

The T-REACH unit performs all of the functions of a conventional CSU such as signal regeneration, loop back control, and some diagnostics. The switch 10 is provided with conventional maintenance access ports (MAP) 26 and local test equipment 28. As is known the MAP permits pulling down anything going through the switch and converting it to a digital signal 0 level (DSO). In the case of Tl coming in and out of the switch the MAP can pull, for example, a channel 1 and a channel 2 and look full duplex both ways on two channels, i.e., two time slots. It is possible to bridge a pulled channel or drop an insert and make it come down. A channel pulled down to the MAP position no longer goes through but is available for testing with the local test equipment. Current digital switches are conventionally provided with two maintenance access ports or MAPS.

A local control terminal 30 is connected by a data link 32 to the T-REACH unit 24 to provide control of the T-REACH from the local digital switch. The data link also may constitute overhead on the Tl or it may be provided as a dial-up modem to permit the terminal to instruct the T-REACH microprocessor. The technician at the local terminal can select the line and trunk route going out of the switch. A single T-REACH unit can handle a site and there is no necessity for a T-REACH per Tl facility.

Figure 2:
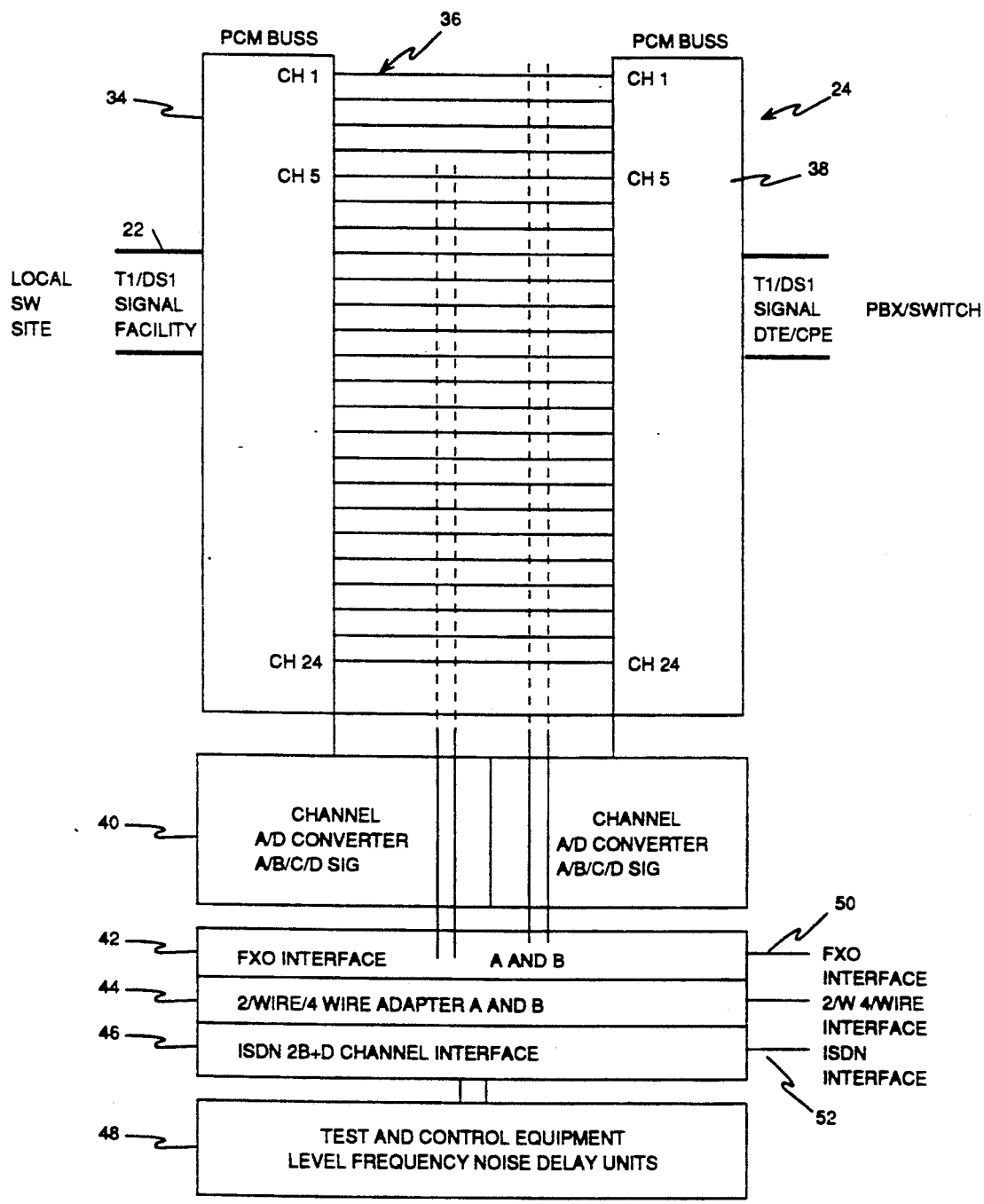
FIG. 2 is a diagrammatic illustration of functional aspects of a T Carrier Remote Access Check device (REACH) constructed according to the invention.

Referring to FIG. 2 there are illustrated certain functional aspects of the T-REACH 24. The Tl signal on the facility side at 22 comes in to the facility end 34 of a PCM bus having channels 1-24 indicated at 36. These terminate at the CPE or DTE end 38 of the PCM bus which may be the PBX side. FIG. 2 illustrates the drop and insert of two circuits, namely, channels 1 and 5. These channels drop out while the remaining channels 2, 3, 4 and 6-24 pass through undisturbed. The T-REACH unit under control of the local control terminal 30 has the capability to select any one of the 1-24 circuits or channels and drop these DSO. The dropped channels 1 and 5 are 64 Kbs. and are dropped through analog to digital (A/D) converters indicated at 40 to produce analog signals, and also strip out the A, B, C and D signaling that is associated with a standard Bell or AT&T and approved Tl format.

After the two dropped circuits have gone through the analog section 40 they are passed into selected interfaces 42, 44 and 46 which are software selectible from the control terminal 30 at the local switch 10. The local control terminal 30 acts through the microprocessor in the T-REACH to provide the selection of any of the desired 1-24 channels or circuits and once they are selected to select the desired interface 42, 44 or 46. As shown in FIG. 2 these are the FXO interface 42, the 2/wire 4/wire adapter with A and B signaling 44, or the ISDN channel interface 46 which is data/voice and clear channel signaling. The FXO and ISDN interfaces 42 and 46 are connected around the PBX or switch 12 to its line side by loops 50 and 52 respectively as seen in FIG. 1. These loops are assigned to station (or telephone) numbers.

Testing and control equipment comprising level frequency noise and delay units may optionally be provided at 48. This may be equipped with software controllable test equipment. However the objective of the T-REACH unit is to eliminate the need for test equipment at the remote site and the need for a technician to visit the site to troubleshoot a problem without knowing the nature of the difficulty. It will be appreciated that the units 40, 42, 44, 46 and 48 per se represent conventional or standard equipment although such equipment is not found in existing CSU devices.

Figure 3:
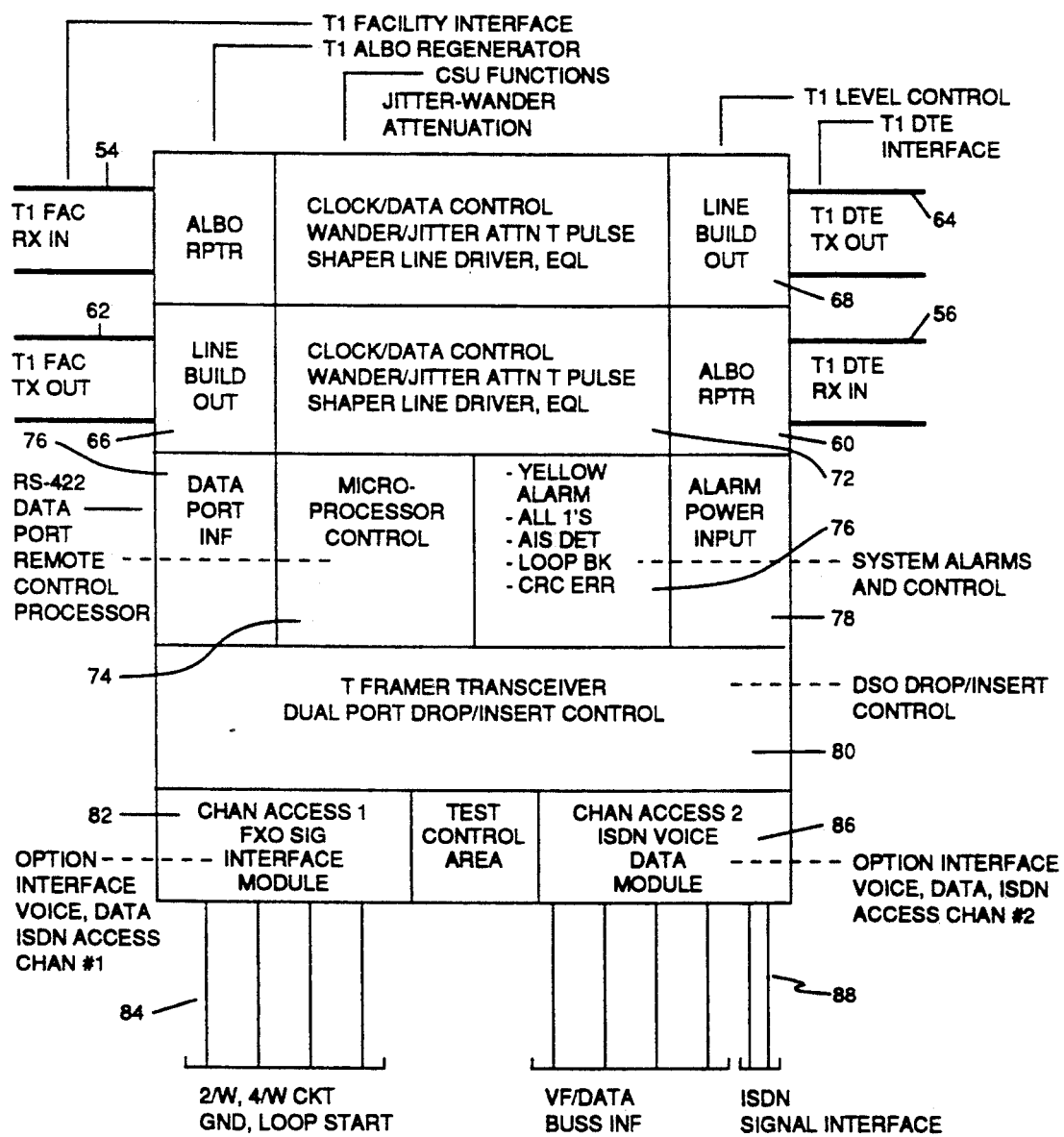
FIG. 3 shows diagrammatically the stages of a T-REACH module.

Referring to FIG. 3 there is shown a diagram of the stages of the T-REACH module. Thus the T1 facility interfaces in 54 and the T1 facility from the DTE or PBX side interfaces in at 56 through conventional ALBO repeaters or regenerators 58 and 60. Similarly the T1 facility interfaces out at 62 and the T1 DTE interfaces out at 64 through line build out circuitry 66 and 68. Conventional CSU functions such as jitter-wander attenuation, clock/data control, T pulse shaper, and line driver equalizer functions are provided at 70 and 72 Microprocessor control is provided at 74 via a RS422 data port 76 to provide remove control. System alarms and control such a yellow alarm, all ones, AIS determination, loop back and CRC error are provided at 76. Alarm power input is provided at 78. The T-REACH unit includes DSO drop/insert control and T framer transceiver function at 80. Channel 1 access is provided at FXO signal interface module 82 having 2/wire, 4/wire ground and loop start outputs at 84 and channel 2 access for ISDN, voice and data is provided at 86 having connections 88.

Referring to FIG. 1 the operation of the system and method of the invention may be described as follows. The technician at the site of the local switch 10 and local terminal 30 identifies a DSO circuit or channel in the T1 link or facility which is on hook and accesses that circuit using the local terminal 30. The local terminal 30 communicates to the T-REACH module via the data link 32 and instructs the module to drop and insert the selected on hook DSO circuit. This procedure is communicated back to the terminal where the drop and insert function is confirmed to the technician. Further instructions and communications of the software setup commands are transmitted from the terminal to the T-REACH module such as type of circuit to test, 2/wire, 4/wire, subrate data 2.4-64 Kbs., or a combination of voice, signaling and data via the ISDN interface. Other instructions such as the type of signaling, ground start or loop start is also selected.

The T-REACH module conditions the signaling towards the PBX on the drop and insert channel to be in a busy state to block calls being originated from the station end or line side of the PBX. This blocking of the selected channel from use will remain throughout the span of time that the DSO channel is in the drop and insert state. For illustrative purposes the testing of a 2/wire circuit with ground start option is described. The T-REACH module interface is connected to the preassigned telephone line number on the line side of the PBX 12 as indicated by the loop 50. This loop extends around the PBX or switch 12.

Using the conventional controls provided at the first port of the MAP access to the local digital switch 10 the technician selects and accesses a channel circuit in any other DSO link which is not in operation. Accessing this circuit produces a dial tone from the PBX back to the MAP position and the first port. The technician thereupon dials the preassigned number of the 2/wire circuit 50 connected to the T-REACH module. The ringing signal is passed from the PBX via loop 50 to the T-REACH module and converted from loop signaling to A/B bit signaling used on a T1 facility to pass signaling supervision. This signaling proceeds along the facility side of the insert channel to the local switch 10 and the second port of its MAP. The caller channel circuit which originated at the first port of the MAP of the local digital switch is now rung at the MAP position second port.

Once the ringing circuit is answered the loop is completed. The circuit path originates at the MAP position, is transmitted via the selected T1 facility and DSO circuit to the PBX, passes through the PBX trunk side, is switched to the preassigned T-REACH number (2/wire loop 50) and enters the T-REACH module via loop 50. The T-REACH module converts the 2/wire loop type interface to 4/wire and converts the loop signaling to A/B signaling, converts the analog signal (voice) to a digital (64 Kbs.) encoded data signal using the same standards as defined for channel banks and PBX line cards when the analog signals are converted analog to digital and digital to analog. The encoded signal is transmitted to the local switch 10 via the inserted channel and is routed through the switch from the T1 trunk interface via the switching plane to the MAP second port.

After the circuit has been established, the full duplex channel circuit can be tested from the local digital switch MAP position using the test equipment located at the MAP. Tests such as but not limited to the following may be performed: voice level in dBm, in band signaling operation, noise on the channel circuit, frequency and phase delay, signal distortion, quantizing noise, analog data transmission analysis, for example, bit and block errors, protocols, etc. and impulse noise.

This testing ability results in unique advantages. For example, when a carrier such as a long haul carrier or RBOC sells services over its facilities it is imperative that the customer be provided trouble free service. Thus the equipment and network may not simply be installed and checked but also must be repeatedly checked to insure continuing satisfactory operation. This poses problems. A basic problem is the inability of the carrier to ensure trouble free operation on a daily basis end-to-end. A particular RBOC can handle only its immediate regional territory. Yet much of its traffic comes from other RBOCs which may be located cross country.

It is an advantage of the instant invention that it creates the ability to dial and go behind the PBX and make a call through the PBX back to the original off hook dialed location. The present invention permits dropping out a circuit and using that connection to go around the PBX to connect to the line side and appear as a telephone station on the line side of the PBX. Once this circuit is established it is possible to send a data test pattern through the circuit and measure 511, 2047, etc. substrate bit error rate patterns. It is possible to operate datascopes. Messages can be run and viewed at the datascope on the return signal by looping back through the system to determine that either a good or a defective path through the system exists. This is possible on a round trip basis completely under control from the MAP position. If optional test equipment is incorporated in the T-REACH it is also possible to compare the results of a round trip test with that which may be obtained by being able, for example, to instruct the T-REACH test equipment to send a tone such as 1004 Hz. Jitter or delay can then be measured in one direction and subtracted from the round trip jitter or delay. It is then possible to ascertain what the PBX is contributing. The same type test may be made with respect to noise. It is possible to perform Bell or FCC specified tests on analog or digital circuits without having to create new parameters.

To facilitate additional tests, local test functions may be provided by the T-REACH module. These functions are controlled by the T-REACH module software and the local terminal located at the local digital switch. The instructions and data are passed between the T-REACH module and the terminal by the serial data port. These test functions and features may be as follows: voice frequency tones generator including 404, 1004, 2804 Khz. and other frequencies not defined, noise type C message filter with and without slot filter, noise to ground measuring capability, dBm. level flat.

The T-REACH module is equipped to direct these test functions towards the channel circuit drop 2/wire for transmission to the PBX line or towards the T1 DSO channel for transmission to the local digital switch MAP position to facilitate one way testing from the PBX to the MAP position.

The data link interfacing the local terminal and the remote T-REACH module is a 2.4 Kbs. data circuit which can be transmitted in several modes. For example, the data can be transmitted via the ESF 4.0 Kbs. data channel on the T1 facility or by a dial up modem using conventional dial subscriber lines.

The T-REACH module functions as a conventional customer service unit (CSU) which serves to terminate the T1 facility and provide interface functions to the customer premise equipment (CPE). The T-REACH module provides diagnostics de-jitter, pulse shaping, line built out and low level regeneration for the T1 signal. The module also provides local and remote loop back to facilitate the troubleshooting and trouble isolation for the technical staff to locate problems in a conventional manner. Such functions are provided in conventional CSUs presently used in the industry. The T-REACH module monitors and reports conventional industry standard trouble reports and operational parameters such as loss of signal alarm, out of frame, AIS signal detect, yellow alarm detect, one's density violations, CRC errors and failure seconds, bipolar violations count, frame errors, PCM controlled slip, and change frame alignment.

The T-REACH module features four codes which are used in the industry and which are standard codes specified in the technical publications. These are:

ZBTSI CLEAR CHANNEL MODE. ZBTSI or non-ZBTSI mode must be configured for each T1 line input if this code is used. This ZBTSI mode provides clear channel capability using zero byte time slot interchange, according to T1X1 draft specification T1X1.4/87-710.

B8ZS CLEAR CHANNEL MODE. B8ZS or non-B8ZS mode must be configured for each T1 signal when the B8ZS code is present. This B8ZS mode provides clear channel capability according to Bellcore TR-TSY-000170.

AMI ALTERNATE MARK INVERSION.

B7 BIT STUFFING. This is an early version used to stuff bits in a T1 frame when low level data is detected in the 8 bit word.

The T-REACH module provides interfacing for three types of frames used in the United States industry, extended super frame (ESF), super frame (SF) and Subscriber Line Carrier * AT&T registered SLC-96 type framing. For drop and insert capability, one of these frames is selected for framing to interface the local digital switch and PBX.

Figure 4:
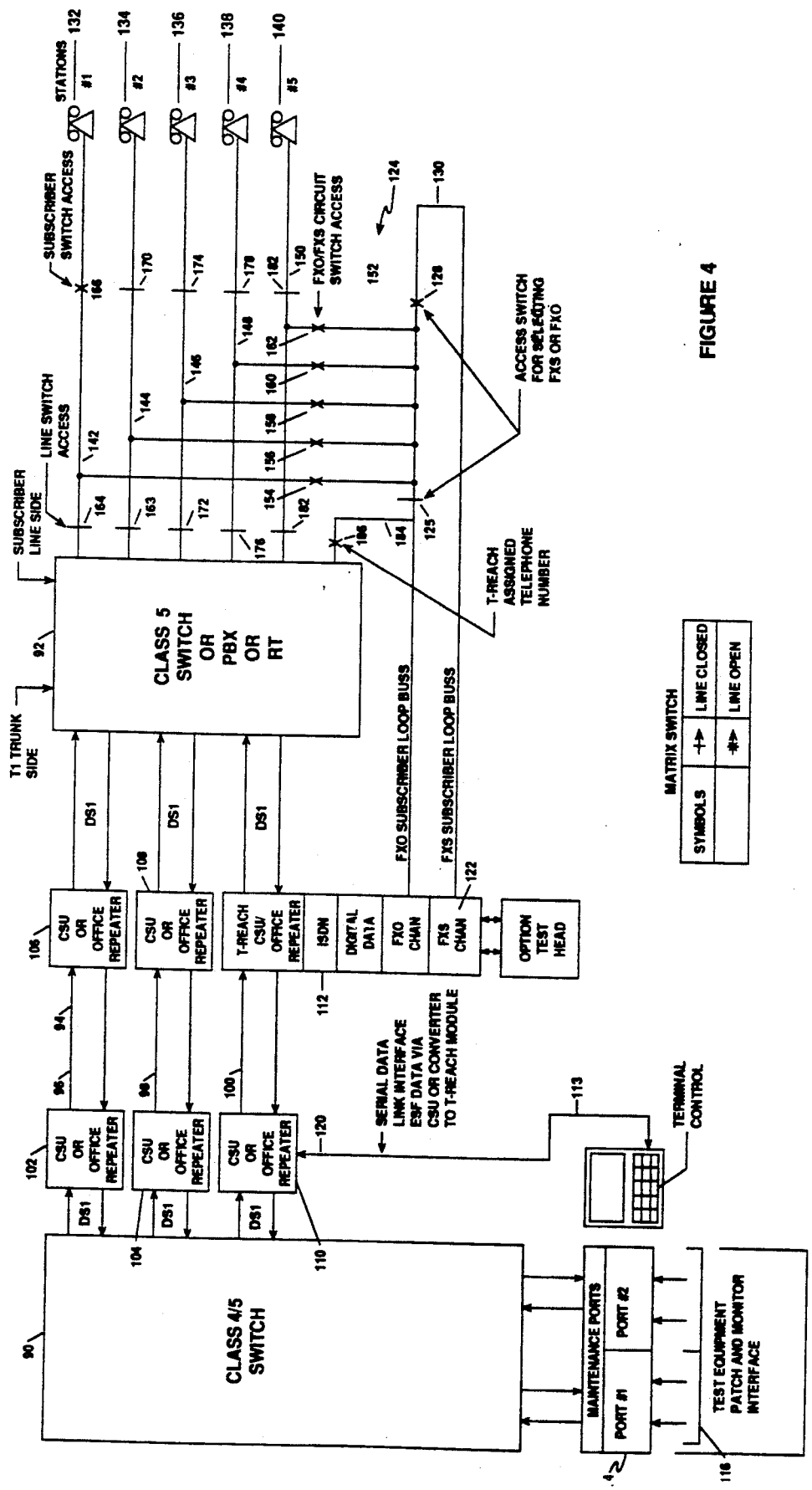
FIG. 4 is a diagrammatic illustration of another embodiment of the invention.

Referring to FIG. 4 there is shown a second embodiment of the invention. Referring to this figure a local digital switch such as a class 4/5 switch 90 is connected to a remote class 5 or the like switch or PBX switch 92 via a T1 link indicated generally at 94 and comprising a plurality of T1 DSI facilities 96, 98 and 100. The T1 facilities 96 and 98 are connected through CSUs or office repeaters 102, 104 and 106, and 108 at the central office and PBX respectively. T1 facility 100 is connected via CSU or office repeater 110 at the central office and by T-REACH module 112 at the PBX end.

The central office switch 90 is provided with conventional maintenance ports 1 and 2 shown at a MAP 114. An associated test equipment patch and monitor interface and related test equipment are provided at 116. A control terminal 118 is connected to the T-REACH module 112 via a serial data link interface 120 such as ESF data via CSW or converter. The T-REACH module 112 includes the same elements as discussed previously in conjunction with FIGS. 1, 2 and 3 in addition to an FXS channel interface indicated at 122.

In this embodiment of the invention the FXO channel and FXS channels of the T-REACH module are connected to the drop or subscriber side of the PBX or switch 92 by a matrix switch indicated generally at 124 which is controlled by the software of the T-REACH module. The matrix switch 124 includes single pole, single throw switches 126 and 128 in the FXO/FXS subscriber loop bus 130. The relays or switches in the matrix are shown using the convention of "X" to indicate the open condition and a perpendicular line to indicate the closed condition.

The subscriber side of the PBX or switch 92 is connected to a series of subscriber stations 132-140 via subscriber loops 142-150. The FXO/FXS subscriber loop bus between switches 126 and 128 is connected to the subscriber loops 142-150 via lines 152 and switches 154-162. At each side of the nodes between the subscriber loops 142-150 and lines 152 are provided switches 164-166, 168-170, 172-174, 176-178, and 180-182. The T-REACH assigned telephone number connection 184 is connected to the PBX via switch 186.

The operation of this embodiment of the invention is generally similar to that above described and may be described in particular as follows: In order to perform tests with the system, a technical staff member or technician accesses the T-REACH module 112 through the use of a terminal 118 at the MAP position. One or two DSO circuits of a total of 24 slots of T1 trunk link 100 can be accessed for drop/insert to the drop interface of choice. The DSO can be assigned any one of the several types of interfaces as determined by the operator for use in a specific test. Thus if the technician commands the T-REACH module to connect to the foreign exchange office interface (FXO) this connects the FXO interface to the line side of the PBX directly through line 184 and switch 186 as with the embodiment of FIG. 1.

The foreign exchange subscriber (FXS) interfaces with the telephone stations 132-140 which operate as a phone termination for ground or loop start tests.

Dropping and inserting two DSO circuits, one assigned to the FXO interface and one to the FXS interface, reroutes the subscriber circuit by back-haul through the MAP position and returns to the subscriber telephone. The matrix switch relays will activate under software control of the T-REACH unit to isolate the normal working subscriber line and place this line into a test mode. Both the FXO and the FXS lines are routed through test equipment in tandem by patching the circuit on a voice and signaling mode back to back at the MAP position. This supports the troubleshooting of a subscriber circuit while in a normal in-service mode. The technician can further terminate a call or originate a call to the subscriber by bypassing the PBX or switch 92 to confirm the condition of the subscriber cable or station set. The FXO and FXS bus is configured to open and close when the proper module is selected. This can be activated without the loss of a circuit or subscriber call. If data is one the line the data will be corrupted for a short time.

By returning the circuit via back-haul to the MAP position any type of communications and/or data can be tested at the MAP. This eliminates the need for expensive equipment on site and the need to have a technician travel to the site to test T1 or any circuit on the T1 facility.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

I claim:

1. In a communications network having a primary and a subsidiary switching means connected by T Carrier trunk means including multiple T Carrier links and customer service units (CSU) wherein said primary switch means has maintenance access port (MAP) means having at least two ports and said subsidiary switching means has multiple stations connected at the line side thereof;
   remote equipment access check (REACH) means associated with one of said T Carrier links and its CSU at the subsidiary switch means;
   control terminal means connected to said REACH means by a control link for controlling said REACH means;
   said REACH means being connected to the line side of said subsidiary switch means in the manner of a station thereto;
   said REACH means including drop and insert means for dropping and inserting one or more channels of the T Carrier link with which it is associated whereby a loop circuit may be established from one port of said MAP means through a T Carrier in said trunk means and through said subsidiary switch means and drop and inserted channel to the other port of said MAP means.

2. An apparatus according to claim 1 wherein the selection of and dropping and inserting of said one or more channels of the T Carrier link is under control of said control terminal means and said control means is associated with said primary switch means.

3. An apparatus according to claim 1 wherein said loop circuit extends from one port of said MAP means through a T Carrier link selected by said MAP means and through said subsidiary switch means to the REACH means and through the insert channel to the other port of said MAP means.

4. An apparatus according to claim 3 including test means connected to said loop circuit at said MAP means.

5. An apparatus according to claim 1 including test means connected to said insert channel at said REACH means.

6. An apparatus according to claim 3 including test means connected to said insert channel at said REACH means.

7. An apparatus according to claim 1 wherein said REACH means includes multiple interfaces selectably connectable to the line side of said subsidiary switch means.

8. An apparatus according to claim 7 wherein said multiple interfaces are adapted for voice, data and ISDN.

9. A method of testing a communications network having a primary switching means spaced from and connected to a subsidiary switching means through a T Carrier trunk means which includes multiple T Carrier links, wherein said subsidiary switching means has multiple stations connected at the line side thereof, comprising the steps of:
   dropping and inserting a channel of a first T Carrier link at the trunk side of said subsidiary switching means;
   establishing communication from the line side of said subsidiary switching means around said subsidiary switching means to the primary switching means end of the inserted channel; and
   accessing a preselected second T Carrier link remote from said subsidiary switching means and establishing a connection through said accessed second T Carrier link through said subsidiary switching means to the line side thereof and to the circuit extending around said subsidiary switching means to the insert channel in said first T Carrier link to establish a loop circuit having ends which are remote from said subsidiary switching means.

10. A method according to claim 9 wherein said ends of said loop circuit are proximate one another.

11. A method according to claim 9 wherein said first T Carrier link is accessed through said primary switching means to establish one end of said loop and said second T Carrier link extends through said primary switching means to establish the other end of said loop.

12. A method according to claim 9 including the step of testing said loop circuit.

13. A method according to claim 9 including transmitting a test signal through said loop circuit in opposite directions.

14. A method according to claim 9 including testing said loop circuit at the point of said dropping and inserting of a channel.

15. A method according to claim 9 including sequentially testing said loop circuit at the MAP position of said subsidiary switching means and at the point of said dropping and inserting of a channel.

16. A method according to claim 15 includes determining from said tests a differential signal.

* * * * *